Figure 1:
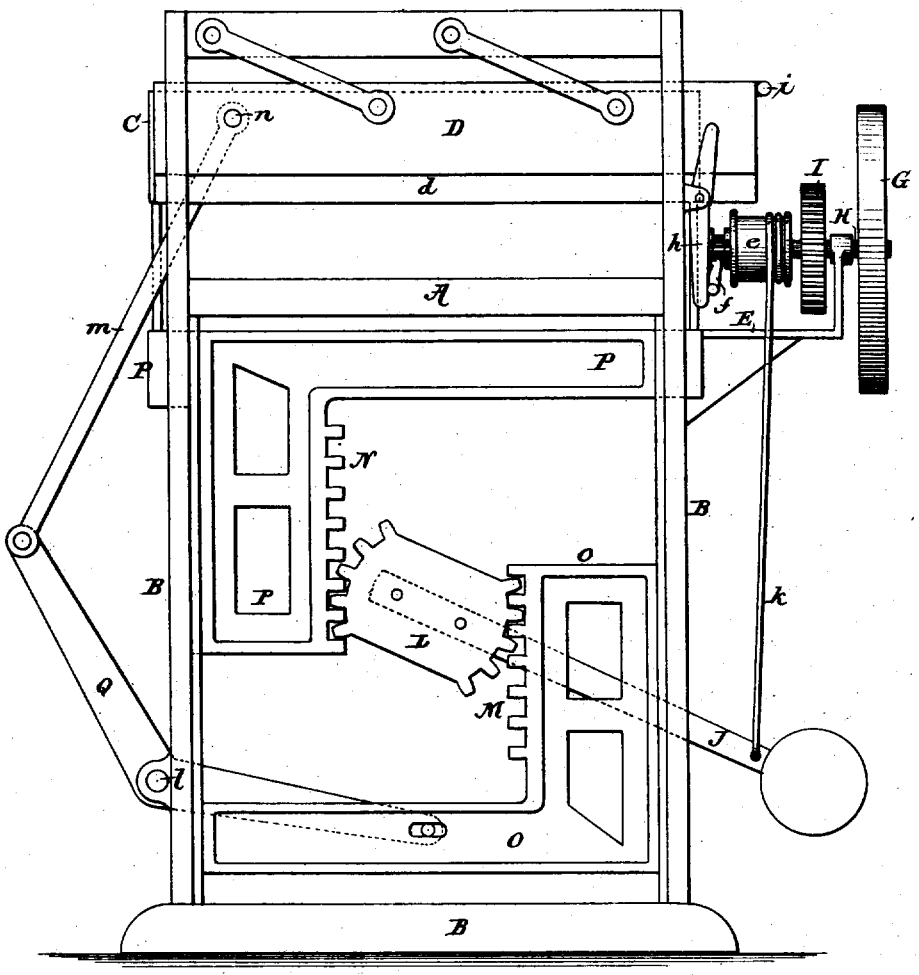

4 Sheets—Sheet 1.

E. R. SHERIDAN.

PAPER CUTTING MACHINE.

No. 9,809. Reissued July 19, 1881.

Attest;
Geo. H. Graham
Jacob Felbel

Inventor,
E. R. Sheridan
by
J. N. McIntire
Atty.

N. PETERS, Photo-Lithographer, Washington, D. C.

E. R. SHERIDAN.

PAPER CUTTING MACHINE.

No. 9,809. Reissued July 19, 1881.

Attest;
Geo. H. Graham
Jacob Felbel

Inventor,
E. R. Sheridan
By
J. N. McIntire
Atty.

N. PETERS, Photo-Lithographer, Washington, D. C.

4 Sheets—Sheet 3.

E. R. SHERIDAN.

PAPER CUTTING MACHINE.

No. 9,809. Reissued July 19, 1881.

Attest;
Geo. H. Graham
Jacob Felbel

Inventor,
E. R. Sheridan
By
Jas. N. McPhiter
Att'y.

N. PETERS, Photo-Lithographer, Washington, D. C.

E. R. SHERIDAN.

PAPER CUTTING MACHINE.

No. 9,809. Reissued July 19, 1881.

Attest;
Geo. H. Graham
Jacob Felbel,

Inventor,
E. R. Sheridan
By
J. N. Mc Intire
Att'y.

N. PETERS, Photo-Lithographer, Washington, D. C.

UNITED STATES PATENT OFFICE.

EDWIN R. SHERIDAN, OF BROOKLYN, NEW YORK.

PAPER-CUTTING MACHINE.

SPECIFICATION forming part of Reissued Letters Patent No. 9,809, dated July 19, 1881.

Original No. 227,999, dated May 25, 1880. Application for reissue filed June 9, 1881.

*To all whom it may concern:*

Be it known that I, EDWIN R. SHERIDAN, of Brooklyn, in the county of Kings and State of New York, have invented certain new and useful Improvements in Paper-Cutting Machines; and I do hereby declare that the following is a full and exact description thereof, reference being had to the accompanying drawings, making part of this specification.

Previous to my invention paper-cutting machines have been made in which the clamping-bar, which is first forced down onto the paper to be cut, and which firmly holds the paper in place during the cutting operation, has served to resist the force employed to move the cutting-knife, so that the pressure of the clamping-bar upon the paper would be increased in proportion to the force necessary to be applied to the knife or shearing-blade; but in all machines with which I am familiar involving this principle of operation the mechanism constituting the means for effecting this sort of co-operative application of the power to the clamping-bar and knife has been comparatively complex and illy adapted to the transmission of the motive power applied to the machine with the least possible waste by friction and with least wear on and liability of derangement in the working parts of the mechanism. An example of such prior machines in which, though the knife and clamp are operated upon the principle alluded to, the organism is such as to be objectionable for the reasons stated, may be seen in United States Letters Patent No. 223,744, of January 20, 1880. Of course no one familiar with the principles of mechanisms will confound the organism shown in said patent with what I am about to herein describe as a novel organism for an analogous purpose, because, as will be presently seen, what I am about to describe as my invention involves the employment of a duplex creeping lever acted upon directly by the driving mechanism and possessing the capacity to operate alternately, as of first one and then another order, while the prior machine referred to embraces an organism in which the movement of the clamping-bar is produced by means of a driving-shaft provided with spur-pinions engaging with racks attached to the clamping-bar frame, and in which the knife-frame is actuated by the same pinions, operating first with a fixed and next with a traveling axis of motion.

My invention has for its object to provide means for the alternate movements of the clamping-bar and knife in a co-operative manner, which, while they shall be capable of transmitting the motive power to the clamping-bar and knife with the greatest degree of economy, shall be exceedingly simple of construction and possess the requisite strength and durability.

To this end and object my invention consists in the combination, with the usual clamping-bar and knife-frame mechanisms, of an actuating-lever suitably connected with each of said mechanisms, whereby I am enabled, by the direct application of the motive power to one end of said lever and a movement of said end in one direction, to effect the movement of the clamping-bar and knife-frame driving devices in opposite directions, as will be presently explained; and my invention also consists in connecting the actuating-lever to the devices for driving respectively the clamping-bar and knife-frame by means of gear-teeth in such manner that said lever, acting first as of one order and then as of another, shall work always with creeping fulcra, as will be hereinafter more fully explained.

To enable those skilled in the art to make and use my invention, I will proceed to more fully describe the construction and operation of my improved machine, referring by letters to the accompanying drawings, making part of this specification, and in which—

Figure 2:
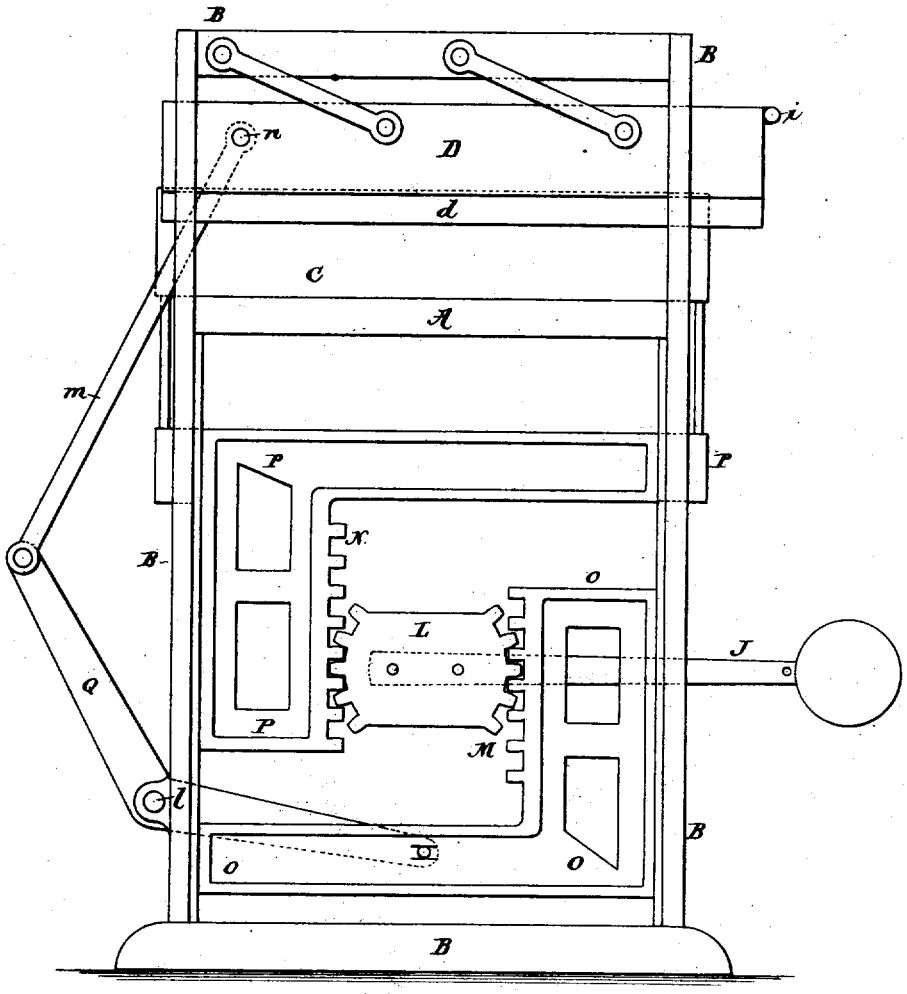
Figure 3:
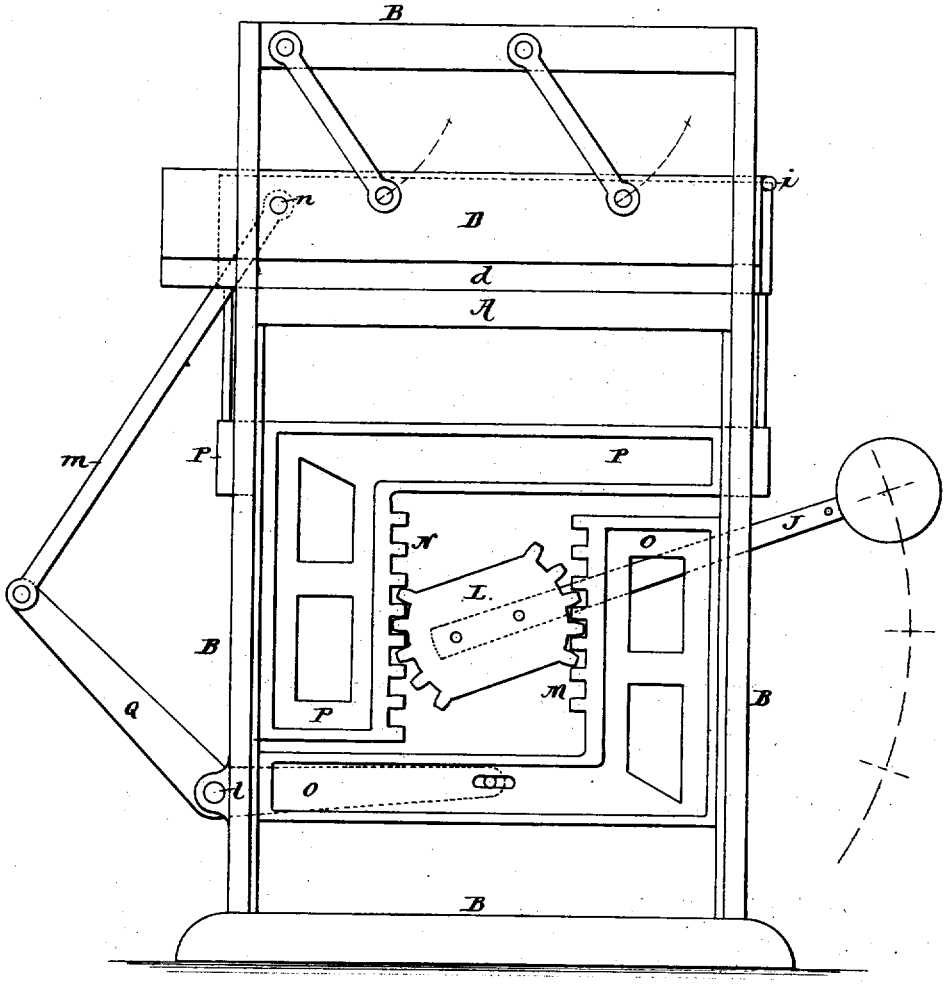
Figure 4:
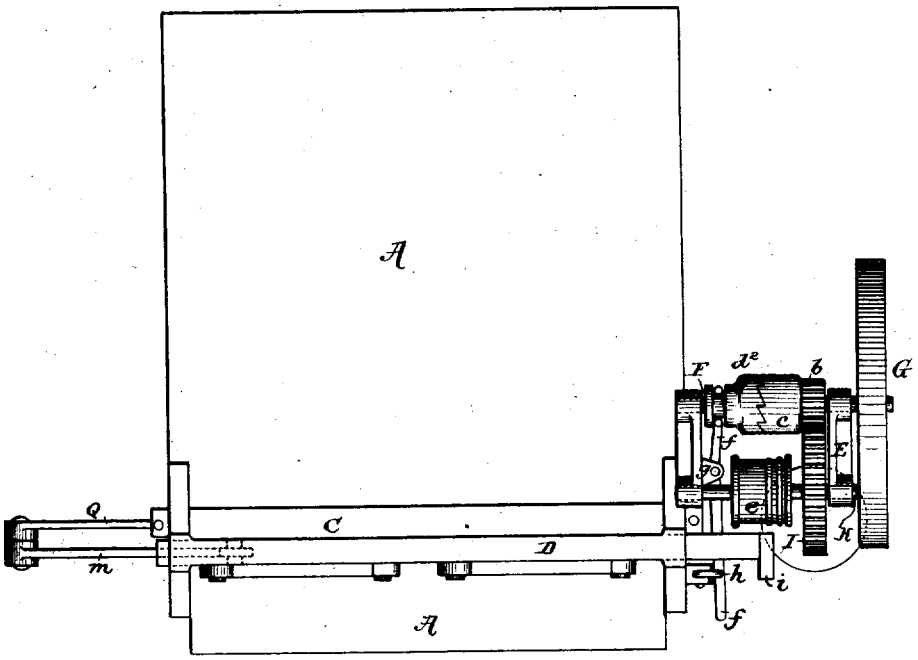

Figure 1 is a face view or front elevation of a machine embracing my invention. Fig. 2 is a similar partial elevation, but showing the moving parts in a different position. Fig. 3 is another similar view with the parts in still another position, and Fig. 4 is a plan or top view.

In the several figures the same part will be found designated by the same letter of reference.

A is the table; B, the main frame or supporting-stand; C, the vertically-reciprocating clamping-bar that holds down the pile of paper to be cut, and D the knife frame or stock carrying the shearing-blade *d*, and having the necessary downward-sweep motion, all constructed and arranged in about the usual manner, but operated or driven by the novel means which I will now more minutely describe.

In a suitable stand, E, arranged at one side of the machine, and in the case shown about on a level with the table, is mounted in suitable bearings the main driving-shaft F, provided with a pulley, G, for the application (by a belt) of the motive power. On this main shaft are mounted so as to turn freely, but not move endwise, a pinion, *b*, and half-clutch *c*, and so as to move endwise on it, but not turn thereon, a half-clutch, $d^2$, the arrangement of these parts being such that a movement of the half-clutch $d^2$ upon the said shaft F in one direction or the other will either cause any rotation of said shaft to be imparted to the said pinion *b* or permit said shaft to revolve without turning said pinion.

In the same stand E is mounted the counter-shaft H, on which are made fast a spur-gear, I, and a drum or strap-wheel, *e*, the said gear I engaging with the pinion *b* and the said drum or wheel *e* having made fast to its periphery one end of a cord or strap adapted to be wound upon said drum, and having its outer end fastened to the end of a lever designed to be lifted, for purposes to be presently explained.

*f* is a shipper-bar, pivoted in a lug, *g*, projecting horizontally from a portion of the stand E, and adapted by a vibratory movement to move the half-clutch $d^2$ to throw the driving-shaft into or out of working engagement with the driving-gears. This shipper-bar is moved by hand in one direction to throw the driving-gears into a working condition, and is automatically moved in the other direction to throw the parts out of gear by a tripping-lever, *h*, pivoted to the main frame, as shown, and moved by a projecting lug or pin, *i*, on one end of the knife-frame.

J is the main working-lever of the machine. It is weighted at its outer or free end, near which the strap or cord *k*, by which said end is lifted, is applied, as clearly shown. This lever J has no fixed fulcrum, but is formed or provided near its inner end with a double sector, or sufficient portion of a spur-gear, L, with which engages two vertically-arranged racks, M and N, that respectively are secured to and move two reciprocatory frames, O and P, and the arrangement together of these parts is such that during the movements of lever J the points of engagement between the racks M and N and portions of gear L that respectively engage with said racks become alternately the moving fulcra of said lever.

Q is a bent lever, pivoted near its angle by a pin, *l*, to the main frame, and having its lower end connected by a pin-and-slot connection to the lower middle part of frame O, while its upper end is pivoted to one end of a connecting-rod, *m*, the other end of which rod is connected at *n* to the knife-frame.

In the operation of the machine, the power being applied by a proper movement of the shipper handle or bar *f*, the rotation of the strap-wheel or drum winds up the cord or strap *k*, and thereby the weighted end of lever J is lifted. During the initial movement of said lever, and until such movement is arrested, its fulcrum is at the point of engagement between the gear L and the rack M, and is a moving fulcrum, the lever acting as a creeping lever, and one of the first order, and operating to depress the rack N and its frame P. When the said frame P shall have been moved down until the clamping-bar C, with which it is connected, shall have come to a bearing and pressure on the paper, the point of contact between the clamp and the paper then becomes the resistance, and since the rack N can move no farther the point of engagement between said rack and the gear L becomes the fulcrum of the lever J, and, as in the first action, the said lever acts as a creeping lever, and in its further movement operates to lift the rack M and the frame O, whereby the bent lever Q is vibrated, and the knife-frame is caused, through the medium of the connecting-rod *m*, to descend and cut the paper, the lever in this part of its movement having, however, been transformed into one of the second order. By the time the cutting-edge of the knife shall have reached the proper point in its descent the pin *i* will have moved the trip-lever *h* and thrown the shipper-handle off to unclutch the driving-gear mechanism, thus automatically stopping the working movements of the knife and other parts, whereupon, by the gravity of the lower frame, O, and the weighted end of the lever J, all the parts are brought to the positions in which they remain during the disuse of the machine.

By the employment of an actuating-arm, J, having the motive power applied to one end thereof, and acting in one direction always, and adapted to act first as a lever of one order and then of another order, as described, a simple, efficient, and durable means is provided for applying the motive power to the parts to be driven. Of course this part of my invention may be carried out in other forms than that I have shown.

It will be seen that by the employment of the duplex creeping lever, as shown and described, operating through the medium of rack N directly on the clamping device to draw it down onto the paper, and then acting, as described, through the medium of the rack M and bent lever Q, to draw down the shearing-knife, the motive power applied to the clamping and cutting mechanisms not only induces the forces applied to these devices to act in the usual directions and manner, (alluded to in the early part of my specification,) but is most economically employed; and that the mechanism through the medium of which said power is transmitted from the main driving mechanism to the clamping and cutting devices is exceedingly simple, durable, and desirable in its construction.

Of course, the forms and precise arrangements of parts shown may be varied without changing the nature of the machine or my invention. I do not therefore wish to be understood as limiting my claim of invention to the particular form of the invention shown; but, Having shown my invention carried out in a machine of the form illustrated, what I claim as new, and desire to secure by Letters Patent, is—

1. In combination with the clamping-bar and knife-frame, and intermediate devices connected therewith, an actuating-arm, J, having the driving-power of the machine applied to one end thereof, (to move said end always in one direction,) the combination being such that said arm acts first as of one order and then as of another, substantially as set forth.

2. The combination, with the cutting and clamping devices, of a duplex creeping lever and racks, connected respectively to the said cutting and clamping devices, substantially as described, for the purposes set forth.

In witness whereof I have hereunto set my hand and seal this 28th day of May, 1881.

E. R. SHERIDAN. [L. S.]

In presence of—
JACOB FELBEL,
H. JANVIER.